(12) United States Patent
Moss

(10) Patent No.: US 9,791,005 B2
(45) Date of Patent: Oct. 17, 2017

(54) BRAKE PAD ASSEMBLY HAVING A FLANGE

(71) Applicant: ArvinMeritor Technology, LLC, Troy, MI (US)

(72) Inventor: Peter Moss, Detroit, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 25 days.

(21) Appl. No.: 14/657,004

(22) Filed: Mar. 13, 2015

(65) Prior Publication Data

US 2015/0184711 A1 Jul. 2, 2015

Related U.S. Application Data

(63) Continuation of application No. 13/783,461, filed on Mar. 4, 2013, now abandoned.

(51) Int. Cl.
| | |
|---|---|
| *F16D 65/08* | (2006.01) |
| *F16D 51/18* | (2006.01) |
| *F16D 65/09* | (2006.01) |

(52) U.S. Cl.
CPC ............ *F16D 65/08* (2013.01); *F16D 51/18* (2013.01); *F16D 65/09* (2013.01)

(58) Field of Classification Search
CPC .......... F16D 65/08; F16D 65/09; F16D 65/82; F16D 65/827; F16D 69/0416; F16D 51/56; F16D 2125/30; F16D 51/22
USPC ....................................................... D12/180
See application file for complete search history.

(56) References Cited

U.S. PATENT DOCUMENTS

| | | | |
|---|---|---|---|
| 371,604 A | 10/1887 | Lawrence | |
| 1,592,273 A | 7/1926 | Kelly | |
| 1,636,003 A | 7/1927 | La Brie | |
| 1,647,661 A * | 11/1927 | Peterson | F16D 65/08 |
| | | | 188/250 C |
| 1,660,135 A | 2/1928 | Price | |
| 1,673,416 A | 6/1928 | McConkey | |
| 1,719,372 A | 7/1929 | Huck | |
| 1,727,874 A | 9/1929 | Ford | |
| 1,848,084 A | 3/1932 | Bendix | |
| 1,915,000 A * | 6/1933 | McDonald | F16D 65/08 |
| | | | 188/250 F |
| 2,102,855 A * | 12/1937 | Rosner | 188/234 |
| 2,928,510 A | 3/1960 | Kay | |
| 3,650,360 A | 3/1972 | King et al. | |
| 4,771,870 A | 9/1988 | Belk | |
| 5,791,443 A | 8/1998 | Manz | |

FOREIGN PATENT DOCUMENTS

| | | |
|---|---|---|
| CH | 235689 A | 12/1944 |
| CN | 202017716 U | 10/2011 |
| CN | 202203314 U | 4/2012 |

(Continued)

OTHER PUBLICATIONS

Chinese Patent Office, Office Action for the corresponding Chinese Patent Application No. 201410038101.8 mailed Dec. 4, 2015.

*Primary Examiner* — Bradley King
*Assistant Examiner* — Stephen Bowes
(74) *Attorney, Agent, or Firm* — Brooks Kushman P.C.

(57) ABSTRACT

A brake pad assembly having a table and a web. The web may extend from the table and include a flange that may be disposed opposite the table.

18 Claims, 4 Drawing Sheets

(56) References Cited

FOREIGN PATENT DOCUMENTS

| CN | 202371060 U | 8/2012 |
|----|-------------|--------|
| CN | 202381598 U | 8/2012 |
| CN | 203051564 U | 7/2013 |
| FR | 879050 A | 2/1943 |
| JP | 02051627 A | 2/1990 |

\* cited by examiner

BRAKE PAD ASSEMBLY HAVING A FLANGE

CROSS-REFERENCE TO RELATED APPLICATIONS

This application is a continuation of U.S. application Ser. No. 13/783,461, filed Mar. 4, 2013, the disclosure of which is hereby incorporated in its entirety by reference herein.

TECHNICAL FIELD

The present application relates to a brake pad assembly having a flange.

BACKGROUND

A brake shoe assembly is disclosed in U.S. Pat. No. 5,791,443.

SUMMARY

In at least one embodiment, a brake pad assembly is provided. The brake pad assembly may include a table and first and second webs that may extend from the table. The first and second webs may include a first surface, a second surface, a first end surface, a second end surface, and a flange. The second surface may be disposed opposite the first surface. The first end surface may be disposed adjacent to the table. The second end surface may be disposed opposite the first end surface. The flange may be disposed proximate the second end surface and may extend along an arc to a flange end surface that may be spaced apart from the second end surface. The flange on the first web may extend toward but may not engage the flange on the second web.

In at least one embodiment, a brake pad assembly is provided. The brake pad assembly may include a table, a friction material, and first and second webs. The table may have a first table surface and a second table surface that may be disposed opposite the first table surface. The friction material may be disposed proximate the first table surface. The first and second webs may extend from the second table surface and may not engage each other. The first and second webs may each include a first surface, a second surface, a first end surface, a second end surface, a first bearing flange, a second bearing flange, and a flange. The second surface may be disposed opposite the first surface. The first end surface may extend from the first surface to the second surface and may be disposed on the second table surface. The second end surface may extend from the first surface to the second surface and may be disposed opposite the first end surface. The first bearing flange may extend from the first surface. The second bearing flange may be spaced apart from the first bearing flange and may extend from the first surface. The flange may be disposed between the first bearing flange and the second bearing flange. The flange may have a flange end surface that may be spaced apart from and may not engage the first surface, the second surface, and the second end surface. The flange may extend along an arc to the flange end surface.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
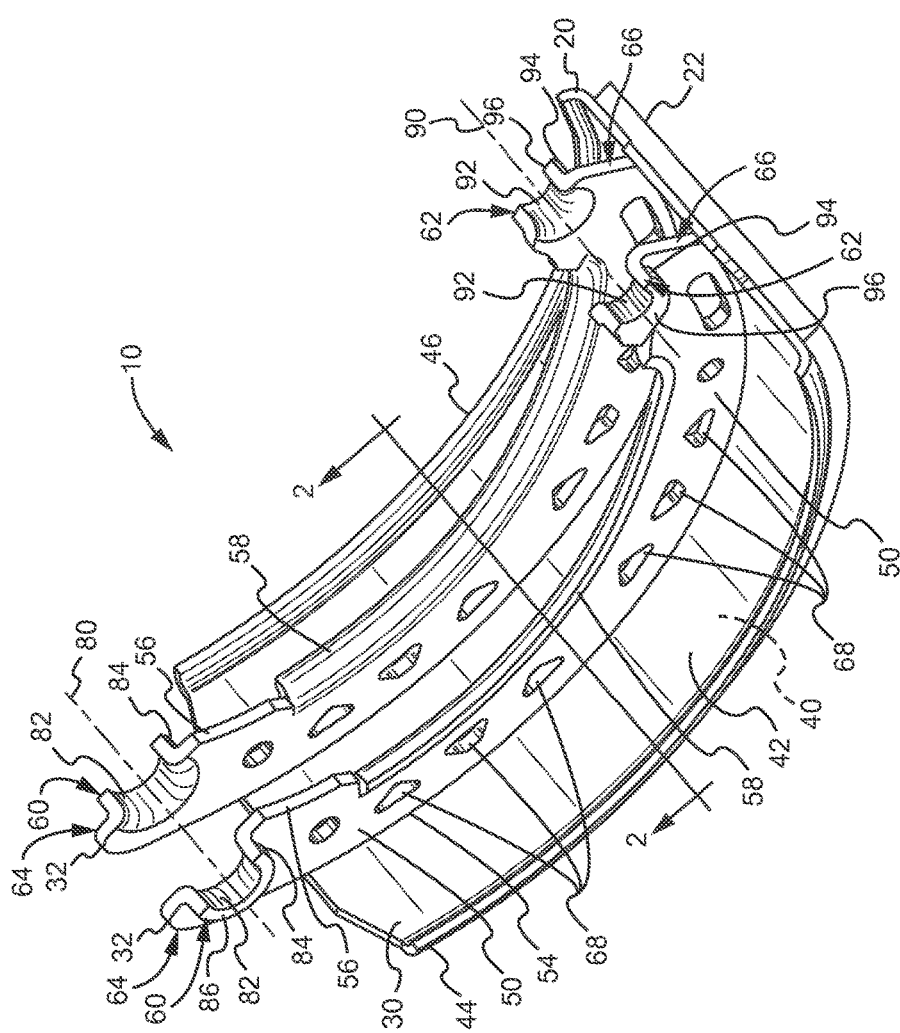
FIG. 1 is a perspective view of an exemplary brake pad assembly.

Referring to FIG. 1, an exemplary brake pad assembly 10 is shown. The brake pad assembly 10, which may also be called a brake shoe assembly, may be configured for use with a vehicle, such as a motor vehicle like a truck, bus, farm equipment, military transport or weaponry vehicle, or cargo loading equipment for land, air, or marine vessels. In addition, the brake pad assembly 10 may be provided on a trailer that may be coupled to or provided with a motor vehicle.

The brake pad assembly 10 may be configured for use with a drum brake. In a drum brake configuration, one or more brake pad assemblies may be configured to engage an inner surface of a brake drum to slow the rotation of a wheel assembly that is coupled to the brake drum. In at least one embodiment, the brake pad assembly 10 may include a brake shoe 20 and a friction material 22.

The brake shoe 20 may be a structural member of a brake pad assembly 10 and may facilitate mounting of the brake pad assembly 10 to the vehicle. The brake shoe 20 may include a table 30 and at least one web 32.

The table 30 may be configured to support the friction material 22. The table 30 may have a unitary or one-piece construction. In addition, the table 30 may be curved or extend along an arc that may have a substantially constant radius and may include a first table surface 40, a second table surface 42, a first table side 44, and a second table side 46.

The first table surface 40 may be an outer surface of the brake shoe 20. The first table surface 40 may support and may engage the friction material 22.

The second table surface 42 may be disposed opposite the first table surface 40. The second table surface 42 may be disposed generally parallel to the first table surface 40.

The first and second table sides 44, 46 may be disposed opposite each other and may extend between the first table surface 40 to the second table surface 42.

At least one web 32 may extend from the table 30. In FIG. 1, two webs 32 are shown that are spaced apart from each other. The webs 32 may have the same configuration, or may have configurations that mirror each other as will be discussed in more detail below. The webs 32 may extend from the second table surface 42 and may be disposed between and may extend generally parallel to the first and second table sides 44, 46. In addition, the webs 32 may be disposed substantially perpendicular to the second table surface 42 in one or more embodiments. The webs 32 may be mounted to the table 30 in any suitable manner, such as by welding or with one or more fasteners. Moreover, each web 32 may be a stamping and may have a unitary or one-piece construction. Alternatively, the flanges described below could be provided as separate components that may be welded or otherwise attached to fabricate the web 32. Each web 32 may include a first surface 50, a second surface 52, a first end surface 54, a second end surface 56, a flange 58, a first bearing flange 60, a second bearing flange 62, a first end 64, and a second end 66.

The first surface 50 may be disposed opposite the second surface 52. The first and second surfaces 50, 52 may be substantially planar and may be disposed generally parallel to each other in one or more embodiments. In addition, the first and second surfaces 50, 52 may extend substantially perpendicular to the table 30. Optionally, a set of openings 68 may extend from the first surface 50 to the second surface 52. The openings 68 may be disposed between the table 30 and the flange 58. In the embodiment shown in FIG. 2, the openings 68 are also spaced apart from the table 30 and the second end surface 56. The openings 68 may have any suitable configuration and may help reduce weight of the brake shoe 20.

The first and second end surfaces 54, 56 may extend between the first and second surfaces 50, 52. The first end surface 54 may be disposed proximate and may engage the second table surface 42. The second end surface 56 may be disposed opposite the first end surface 54 and may be spaced apart from the table 30. The second end surface 56 may at least partially define the flange 58.

Figure 2:
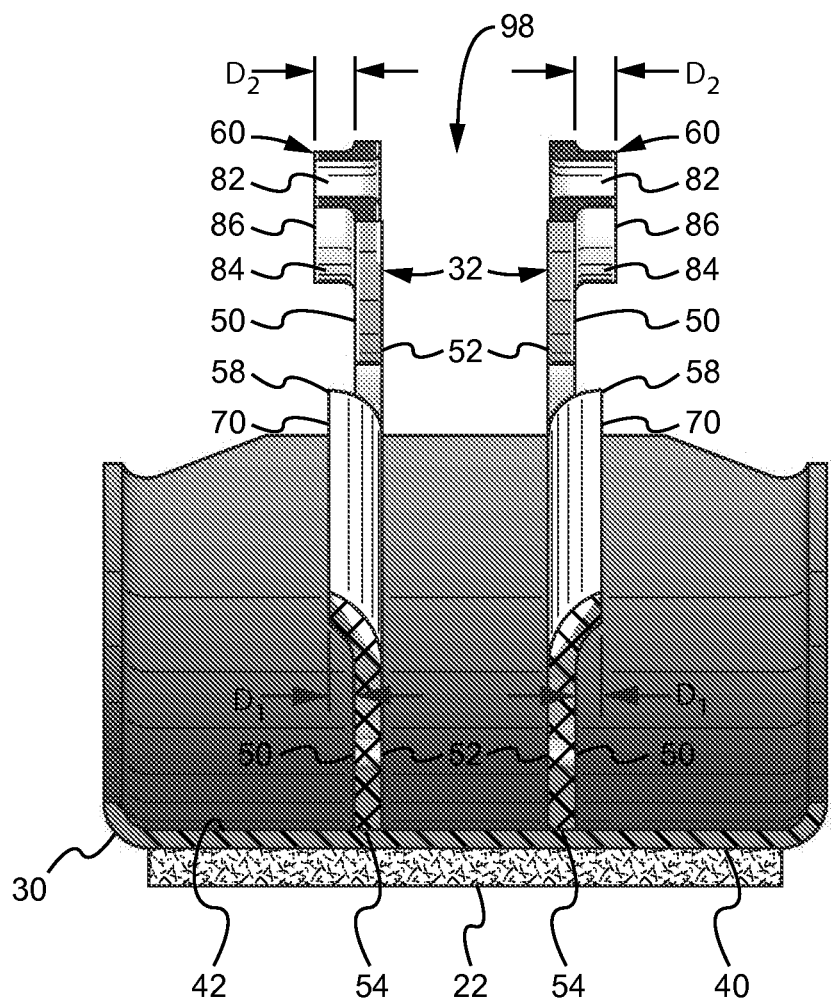
FIG. 2 is a section view of the brake pad assembly shown in FIG. 1 along section line 2-2.

The flange 58 may help increase the stiffness of the web 32 and the brake shoe 20. The flange 58 may be spaced apart from the table 30 and may be disposed adjacent to or may be at least partially defined by the second end surface 56. In the embodiment shown in FIG. 1, the flange 58 extends substantially perpendicular to the first surface 50 or substantially perpendicular to a side of the web 32. In addition, the flange 58 or a portion of the flange 58 may extend along an arc and may extend substantially parallel to the table 30 in one or more embodiments. The flange 58 may be disposed between the first bearing flange 60 and the second bearing flange 62. In addition, the flange 58 may be spaced apart from the first bearing flange 60 and/or second bearing flange 62 in one or more embodiments. The flange 58 may have a flange end surface 70 that may be disposed at an end of the flange 58 and that may be spaced apart from the first surface 50 and/or second surface 52. In FIG. 2, the distance from the first surface 50 to the flange end surface 70 is designated D1.

The first bearing flange 60 may be disposed proximate a first end 64 of the web 32. The first bearing flange 60 may be radially disposed with respect to a first axis 80 that may extend substantially perpendicular to the web 32 in one or more embodiments. As such, the first bearing flange 60 may extend along an arc and may define an inner bearing flange surface 82 that may be configured to receive a component, such as an anchor pin, that facilitates mounting of the brake pad assembly 10 to another component, such as a spider that may be mounted to the vehicle.

An outer bearing flange surface 84 may be disposed opposite the inner bearing flange surface 82. The first bearing flange 60 may also have a first bearing flange end surface 86. The first bearing flange end surface 86 may extend from the inner bearing flange surface 82 to the outer bearing flange surface 84. The first bearing flange end surface 86 may be spaced apart from the first surface 50 and/or the second surface 52.

The first bearing flange 60 may be longer than the flange 58. For instance, the first bearing flange end surface 86 may be disposed further from the first surface 50 and/or second surface 52 than the flange end surface 70. As such, distance D2, which may be the distance from the first surface 50 to the first bearing flange end surface 86, may be greater than distance D1.

The second bearing flange 62 may be disposed at a second end 66 of the web 32. As such, the second bearing flange 62 may be disposed opposite the first bearing flange 60. The second bearing flange 62 may be radially disposed with respect to a second axis 90 that may extend substantially perpendicular to the web 32 in one or more embodiments. As such, the second bearing flange 62 may extend along an arc and may define an inner bearing flange surface 92 that may be configured to receive a component, such as a cam roller, that facilitates mounting of the brake pad assembly 10 to another component, such as a spider that may be mounted to the vehicle. In one or more embodiments, the diameter of the inner bearing flange surface 92 of the second bearing flange 62 may be less than the diameter of the inner bearing flange surface 82 of the first bearing flange 60.

An outer bearing flange surface 94 may be disposed opposite the inner bearing flange surface 92. The second bearing flange 62 may also have a second bearing flange end surface 96. The second bearing flange end surface 96 may extend from the inner bearing flange surface 92 to the outer bearing flange surface 94. The second bearing flange end surface 96 may be spaced apart from the first surface 50 and/or the second surface 52. The second bearing flange 62 may be longer than the flange 58. In addition, the second bearing flange 62 may have the same length as the first bearing flange 60.

Each web 32 may be configured such that the flange 58, first bearing flange 60, and second bearing flange 62 may extend in the same direction or from a common side or surface of the web 32. In FIG. 2, the webs 32 are configured as mirror images of each other and have flanges that extend in opposite directions or away from each other. More specifically, the flange 58 on the web 32 positioned to the left in FIG. 2 and the flange 58 on the web 32 positioned to the right in FIG. 2 extend in opposite directions. Similarly, the first bearing flanges 60 and second bearing flanges 62 may also extend in opposite directions and away from each other.

Figure 3:
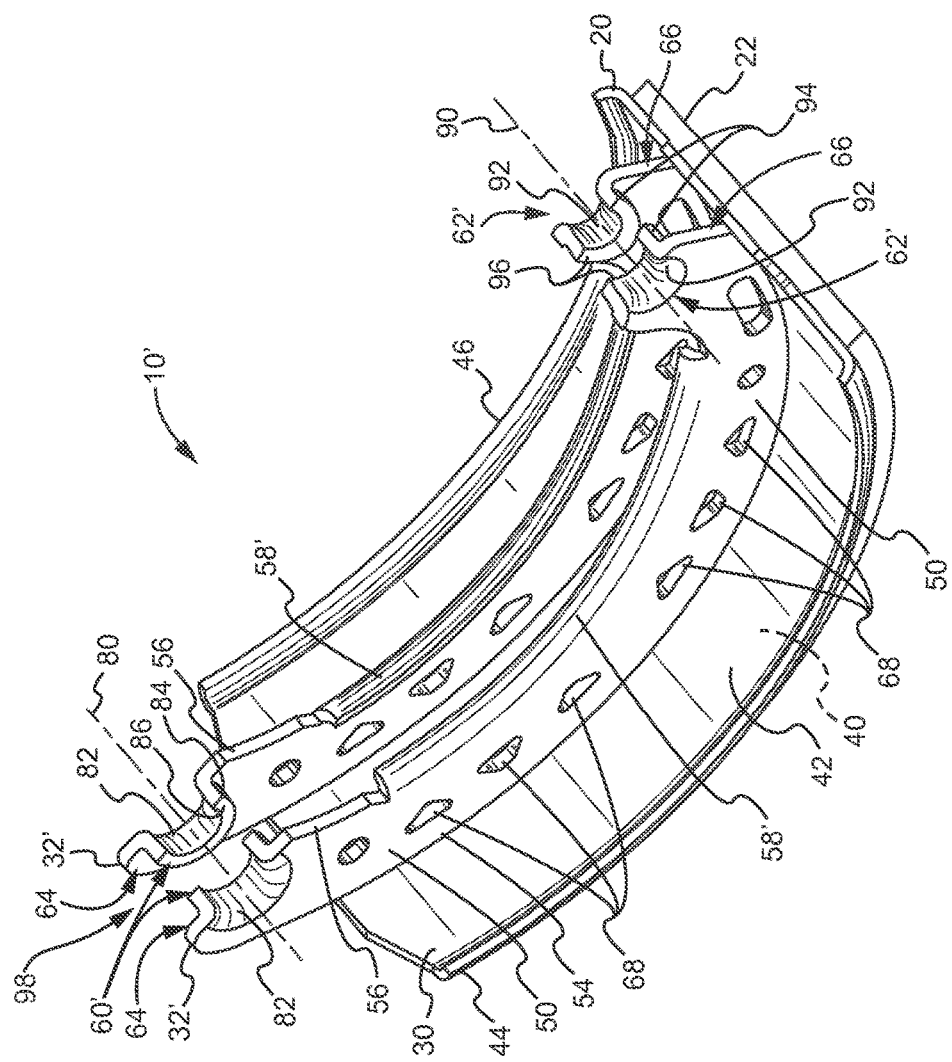
FIGS. 3 and 4 are section views additional brake pad assemblies.
Figure 4:
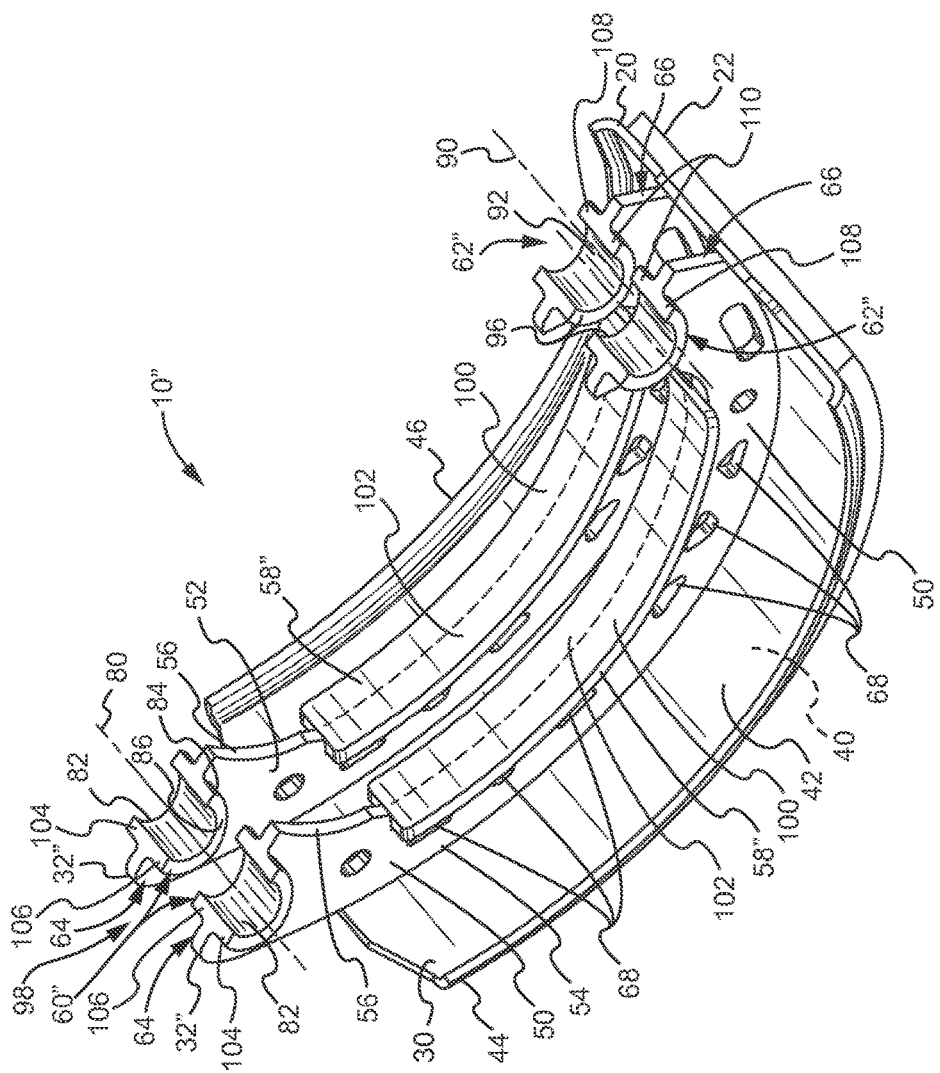

Referring to FIG. 3, another configuration of a brake pad assembly 10' is shown. In FIG. 3, the webs 32' are also configured as mirror images of each other and have flanges that extend toward each other. More specifically, the flange 58' on the web 32' positioned to the left in FIG. 3 and the flange 58 on the web 32' positioned to the right in FIG. 3 extend into a gap 98 disposed between the webs 32' and toward each other. Similarly, the first bearing flanges 60' and second bearing flanges 62' may also extend into the gap 98 and toward each other. The first bearing flange 60' and/or second bearing flange 62' may have a greater length than the flange 58' in one or more embodiments Referring to FIG. 4, another configuration of a brake pad assembly 10" is shown. In FIG. 4, the webs 32" have the same configuration. In addition, the flanges are generally configured with an I-beam or T-shaped configuration in which the flanges extend in multiple directions from the web 32". More specifically, the flange 58" may have a first flange portion 100 that may extend from the first surface 50 and a second flange portion 102 that may extend from the second surface 52. The first and second flange portions 100, 102 may extend in opposite directions and may be at least partially defined by the second end surface 56. The first bearing flange 60" may also have a first portion 104 that may extend from the first surface 50 and a second portion 106 that may extend from the second surface 52. The first and second portions 104, 106 of the first bearing flange 60" may extend in opposite directions and may have a greater length than the flange 58" in one or more embodiments. The second bearing flange 62" may have a first portion 108 that extends from the first surface 50 and a second portion 110 that extends from the second surface 52. The first and second portions 108, 110 of the second bearing flange 62" may also extend in opposite directions and may have a greater length than the flange 58" in one or more embodiments. The first and second bearing flanges 60", 62" may provide increased surface area for engaging and supporting a component, such as an anchor pin or cam roller, and for improving durability and wear life.

The friction material 22, which may also be called a brake lining, may be disposed on the brake shoe 20. More specifically, the friction material 22 may be fixedly disposed on the first table surface 40 and may face toward the brake drum. The friction material 22 may engage the brake drum during vehicle braking and may be spaced apart from the brake drum when the friction braking is not being applied.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake pad assembly comprising:
    a table having a first table surface and a second table surface disposed opposite the first table surface;
    a friction material disposed proximate the first table surface; and
    first and second webs that extend from the second table surface and that do not engage each other, wherein the first and second webs each include:
        a first surface;
        a second surface that is disposed opposite the first surface;
        a first end surface that extends from the first surface to the second surface and is disposed on the second table surface;
        a second end surface that extends from the first surface to the second surface and is disposed opposite the first end surface;
        a first bearing flange that extends from the first surface;
        a second bearing flange that is spaced apart from the first bearing flange and that extends from the first surface; and
        a flange disposed between the first bearing flange and the second bearing flange, wherein the flange has a flange end surface that is spaced apart from and does not engage the first surface, the second surface, and the second end surface;
    wherein the flange of the first web extends along a continuous arc that extends to the flange end surface of the first web and the arc of the flange of the first web curves away from the second web, and the flange of the second web extends along an arc that extends to the flange end surface of the second web and the arc of the flange of the second web curves away from the first web and the flange of the first web.

2. The brake pad assembly of claim 1 wherein the flange, first bearing flange, and second bearing flange on the first web extend from the second surface of the first web and wherein the flange, first bearing flange, and second bearing flange on the second web extend from the second surface from the second web.

3. The brake pad assembly of claim 1 wherein the first bearing flange and second bearing flange of the first web extend substantially perpendicular with respect to the first surface of the first web and the first bearing flange and second bearing flange of the second web extend substantially perpendicular with respect to the first surface of the second web.

4. The brake pad assembly of claim 1 wherein the flange of the first web is spaced apart from the first and second bearing flanges of the first web and the flange of the second web is spaced apart from the first and second bearing flanges of the second web.

5. The brake pad assembly of claim 1 wherein the first bearing flange of the first web has a first bearing flange end surface, wherein the first bearing flange end surface extends further from the first surface of the first web than the flange end surface of the first web.

6. The brake pad assembly of claim 1 wherein the second bearing flange of the first web has a second bearing flange end surface, wherein the second bearing flange end surface extends further from the first surface of the first web than the flange end surface of the first web.

7. The brake pad assembly of claim 1 wherein the first and second bearing flanges extend along an arc.

8. The brake pad assembly of claim 1 wherein the first bearing flange is radially disposed with respect to a first axis and the second bearing flange is radially disposed with respect to a second axis.

9. The brake pad assembly of claim 1 wherein the first and second webs each include a set of openings that are disposed between the table and the flange.

10. A brake pad assembly comprising:
    a table having a first table surface and a second table surface disposed opposite the first table surface;
    a friction material disposed proximate the first table surface; and
    first and second webs that extend from the second table surface and that do not engage each other, wherein the first and second webs each include:
        a first surface;
        a second surface that is disposed opposite the first surface;
        a first end surface that extends from the first surface to the second surface and is disposed on the second table surface;
        a second end surface that extends from the first surface to the second surface and is disposed opposite the first end surface;
        a first bearing flange that extends from the first surface;
        a second bearing flange that is spaced apart from the first bearing flange and that extends from the first surface; and
        a flange disposed between the first bearing flange and the second bearing flange, wherein the flange has a flange end surface that is spaced apart from and does not engage the first surface, the second surface, and the second end surface;
    wherein the flange of the first web extends along a continuous arc that extends to the flange end surface of the first web and the arc of the flange of the first web curves away from second web, and the flange of the second web extends along a continuous arc that extends to the flange end surface of the second web and the arc of the flange of the second web curves away from the first web and the flange of the first web.

11. The brake pad assembly of claim 10 wherein the flange, first bearing flange, and second bearing flange on the first web extend away from the second surface of the first web and wherein the flange, first bearing flange, and second bearing flange on the second web extend away from the second surface from the second web.

12. The brake pad assembly of claim 10 wherein the first bearing flange and second bearing flange of the first web extend substantially perpendicular with respect to the first surface of the first web and the first bearing flange and second bearing flange of the second web extend substantially perpendicular with respect to the first surface of the second web.

13. The brake pad assembly of claim 10 wherein the flange has a first side that extends from the first surface to the flange end surface and a second side that is disposed opposite the first side and extends to the flange end surface, wherein the first side and the second side are both continuously curved and are disposed substantially parallel to each other.

14. The brake pad assembly of claim 10 wherein the flange of the first web is spaced apart from the first and second bearing flanges of the first web and the flange of the second web is spaced apart from the first and second bearing flanges of the second web.

15. The brake pad assembly of claim 10 wherein the first bearing flange of the first web has a first bearing flange end surface, wherein the first bearing flange end surface extends further from the first surface of the first web than the flange end surface of the first web.

16. The brake pad assembly of claim 10 wherein the first bearing flange of the second web has a first bearing flange end surface, wherein the first bearing flange end surface extends further from the first surface of the second web than the flange end surface of the second web.

17. The brake pad assembly of claim 10 wherein the second bearing flange of the first web has a second bearing flange end surface, wherein the second bearing flange end surface extends further from the first surface of the first web than the flange end surface of the first web.

18. The brake pad assembly of claim 10 wherein the second bearing flange of the second web has a second bearing flange end surface, wherein the second bearing flange end surface extends further from the first surface of the second web than the flange end surface of the second web.

* * * * *

UNITED STATES PATENT AND TRADEMARK OFFICE
CERTIFICATE OF CORRECTION

PATENT NO. : 9,791,005 B2
APPLICATION NO. : 14/657004
DATED : October 17, 2017
INVENTOR(S) : Peter Moss et al.

It is certified that error appears in the above-identified patent and that said Letters Patent is hereby corrected as shown below:

In the Claims

Column 7, Line 4, Claim 11:
After "extend away from the second surface"
Delete "from" and
Insert -- of --.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*